United States Patent
Ono

(10) Patent No.: US 11,650,217 B2
(45) Date of Patent: May 16, 2023

(54) DATA PROCESSING SYSTEM FOR ANALYTICAL INSTRUMENT, AND DATA PROCESSING PROGRAM FOR ANALYTICAL INSTRUMENT

(71) Applicant: SHIMADZU CORPORATION, Kyoto (JP)

(72) Inventor: Koji Ono, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 1362 days.

(21) Appl. No.: 16/060,064

(22) PCT Filed: Oct. 5, 2016

(86) PCT No.: PCT/JP2016/079589
§ 371 (c)(1),
(2) Date: Nov. 13, 2018

(87) PCT Pub. No.: WO2017/098793
PCT Pub. Date: Jun. 15, 2017

(65) Prior Publication Data
US 2019/0064193 A1 Feb. 28, 2019

(30) Foreign Application Priority Data
Dec. 8, 2015 (JP) .............................. JP2015-239016

(51) Int. Cl.
*G06F 17/00* (2019.01)
*G01N 35/00* (2006.01)
*G06F 40/186* (2020.01)

(52) U.S. Cl.
CPC ..... *G01N 35/00722* (2013.01); *G06F 40/186* (2020.01); *G01N 2035/0091* (2013.01)

(58) Field of Classification Search
None
See application file for complete search history.

(56) References Cited

U.S. PATENT DOCUMENTS

| | | | | |
|---|---|---|---|---|
| 5,729,665 A | * | 3/1998 | Gauthier | G06K 15/00 358/1.18 |
| 6,681,198 B2 | * | 1/2004 | Buote | G06F 16/24 702/182 |
| 10,162,850 B1 | * | 12/2018 | Jain | G06N 20/00 |
| 10,467,334 B1 | * | 11/2019 | Lowell | G06F 16/93 |
| 2004/0070627 A1 | * | 4/2004 | Shahine | G06F 16/9038 707/E17.141 |
| 2005/0273363 A1 | * | 12/2005 | Lipscher | G06Q 10/06 705/2 |
| 2006/0241353 A1 | * | 10/2006 | Makino | G16H 15/00 600/300 |

(Continued)

FOREIGN PATENT DOCUMENTS

| CN | 101739507 A | 6/2010 |
|---|---|---|
| JP | 2004317177 A | 11/2004 |

(Continued)

OTHER PUBLICATIONS

"Repooto Sakusei Tsuuru (Report Preparation Tool)", Agilent Technologies Japan, Ltd., [accessed on Dec. 2, 2015], the Internet <URL:http://www.chem-agilent.com/contents.php?id=1001720>, total 2 pages.

(Continued)

*Primary Examiner* — Mustafa A Amin
(74) *Attorney, Agent, or Firm* — Sughrue Mion, PLLC

(57) ABSTRACT

When a user creates a template to be used for the creation of an analysis report, a check result record area can be set at an appropriate location in a basic template. The content of the information and other elements to be placed in the check result record area can also be set. With this function, the check result record area can be set for each report item to be checked, with the following elements arranged in the area: a dropdown list for selecting the check result which indicates acceptance/rejection of the content; a character string in which the date and time of checking and the checker's name are automatically inserted; and a text box for describing the reason for rejection (if rejected). In the checking process, the checker inputs those items of information, whereby the result of the check of the content is electronically recorded for each report item.

7 Claims, 6 Drawing Sheets

(56) References Cited

U.S. PATENT DOCUMENTS

| | | | | |
|---|---|---|---|---|
| 2007/0226634 A1* | 9/2007 | Hirai | .................... | G06F 8/10 715/744 |
| 2011/0225011 A1* | 9/2011 | Keskiivari | ........... | G06Q 10/109 705/3 |
| 2015/0295922 A1* | 10/2015 | Dunn | .................... | H04L 63/126 713/176 |

FOREIGN PATENT DOCUMENTS

| | | |
|---|---|---|
| JP | 2007-232480 A | 9/2007 |
| JP | 2013-73292 A | 4/2013 |

OTHER PUBLICATIONS

"LabSolutions LabSolutions Sougou: Kinou Shoukai Repooto Sakusei (LabSolutions LabSolutions General: Introductions to Functions—Report Preparation)", [online], Shimadzu Corporation, [accessed on Dec. 2, 2015], the Internet <URL: http://www.an.shimadzu.co.jp/data-net/labsolitions/function/7_smart_validated-report.htm>, total 3 pages.

Office Action dated Dec. 1, 2020 in Chinese Application No. 201680071886.6. All—12 Pages.

Communication dated Oct. 28, 2019 from the European Patent Office in application No. 16872693.3. All—9 Pages.

Communication dated Jun. 18, 2019 issued by the Japanese Patent Office in counterpart application No. 2017-554953. All—8 Pages.

International Search Report of PCT/JP2016/079589 dated Dec. 27, 2016. All—2 Pages.

International Preliminary Report on Patentability with English Translation of Written Opinion for PCT Appl'n No. PCT/JP2016/079589 dated Jun. 12, 2018. All—16 Pages.

Written Opinion of PCT/JP2016/079589 dated Dec. 27, 2016. All—14 Pages.

\* cited by examiner

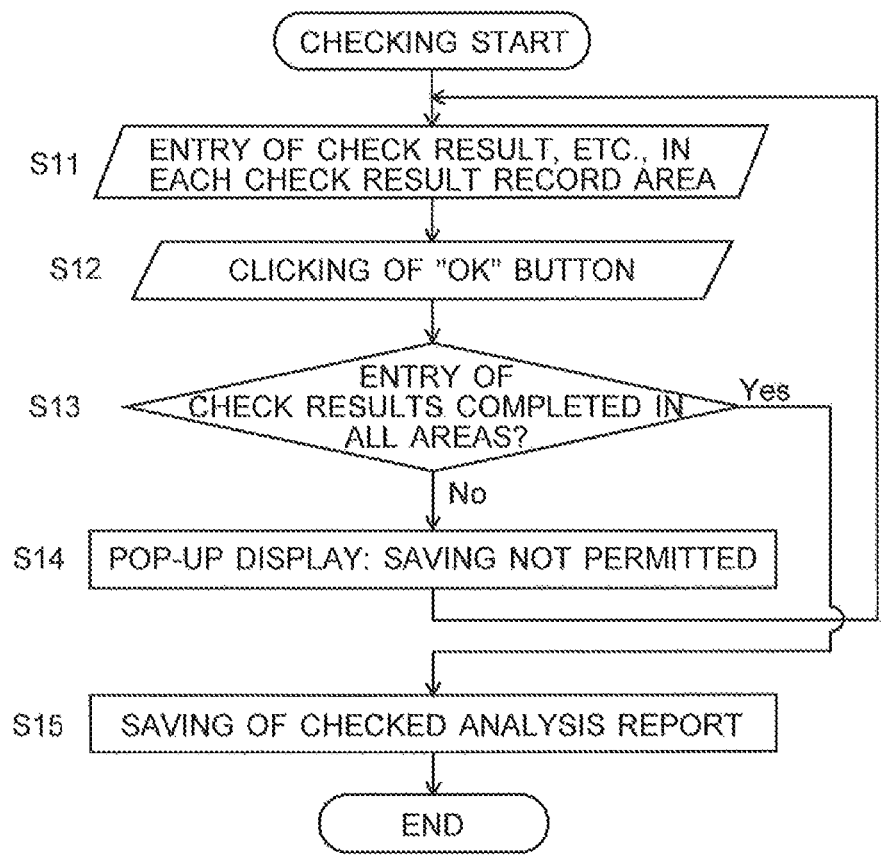

Fig. 4

Analysis Report

<Sample Information>

Sample Information

<Chromatogram>

Checking Form

Chromatogram

<Peak Report>

Checking Form

Peak Table

| Data Analysis | Report Preparation |

Fig. 5

Setting of Recording Format of Check Result Record Area

| Check Result | Accepted | Reason Required |
|---|---|---|
| Accepted | ☑ | ☐ |
| Rejected (ID:001) | ☐ | ☐ |
| Rejected (ID:002) | ☐ | ☐ |
| Rejected (ID:003) | ☐ | ☐ |
| Rejected (Other) | ☐ | ☑ |

Up / Down / Add / Delete

OK  Cancel  Help

DATA PROCESSING SYSTEM FOR ANALYTICAL INSTRUMENT, AND DATA PROCESSING PROGRAM FOR ANALYTICAL INSTRUMENT

CROSS REFERENCE TO RELATED APPLICATIONS

This application is a National Stage of International Application No. PCT/JP2016/079589 filed Oct. 5, 2016, claiming priority based on Japanese Patent Application No. 2015-239016 filed Dec. 8, 2015.

TECHNICAL FIELD

The present invention relates to a data processing system for an analytical instrument for creating an analysis report based on the data collected with various analytical instruments, such as a chromatograph apparatus, mass spectrometer or spectrophotometer, as well as based on various process results or the like calculated from those data. The present invention also relates to a computer program for such a system.

BACKGROUND ART

In recent years, most of the tasks of processing and managing various data acquired with an analytical instrument, such as a gas chromatograph (GC), liquid chromatograph (LC) or mass spectrometer has been performed using a computer on which dedicated software was installed. The "computer" in the present context includes not only a stand-alone type of computer but also a computer system including multiple computers connected to each other through a network, such as a local area network (LAN). In recent years, such a data processing system for an analytical instrument using a computer has been equipped with the function of automatically creating an analysis report which shows a chromatogram, spectrum or similar graph as well as numerical data collected through an analysis or other kinds of data (see Non-Patent Literature 1 or 2, or other documents).

For example, in a data processing system for an analytical instrument using data processing software described in Non-Patent Literature 2, a user selects a template which specifies the arrangement of report items and other elements in an analysis report as well as a data file which contains information to be reported, and issues a command to create an analysis report. Then, the system automatically creates an analysis report with graphs and other elements inserted into the specified positions in the report. Such an analysis report can be provided in the form of a hard copy through a printer as well as in the form of an electronic file in PDF format. The PDF file of the analysis report is automatically loaded into a database constructed on a database server or similar location, to be collectively managed on the database.

In many cases, the task of preparing an analysis report in the previously described manner is performed by an operator who took charge of the analyzing task. It is often the case that the operator merely performs necessary tasks following a routine described in a manual or the like. Therefore, an analysis report prepared by an operator may have some problems, such as an incorrectly inserted graph or the like, or an omission of some item of information which needs to be reported. Accordingly, in many cases, an analysis report which has been prepared by an operator according to a predetermined procedure is subsequently subjected to a checking process in which another individual with a higher level of expertise checks the content of the analysis report and determines whether or not there is any problem with its content. In the following description, an individual who takes charge of such a checking process is called the "checker".

FIGS. 8A and 8B schematically show the procedure of the process of checking an analysis report in a conventional data processing system for an analytical instrument described in Patent Literature 1 or other documents.

A checker who is going to check an analysis report performs a predetermined operation on a client terminal included in a data processing system for an analytical instrument. Then, as shown in FIG. 8A, a checking window 140 including an analysis report 141 to be checked is displayed on a monitor. In the present case, sample information, a chromatogram and a peak table are arranged as the report items in the analysis report 141. The checker visually checks, for example, whether the chromatogram and other items of information inserted in the report are correct, or whether there is any omission of information in the report. If no problem has been located, the checker checks the "Confirmed" checkbox 143 displayed in the lower right portion of the checking window 140. That is to say, in the present case, the action of checking the checkbox 143 corresponds to the recording of the check result.

This operation enables the "OK" button 144 located on the right side of the checkbox 143. The checker clicks this "OK" button 144 with a mouse or similar device, whereupon the date and time of the operation as well as the registered checker name are automatically written in the checker's signature area 142 in the upper portion of the analysis report 141, as shown in FIG. 8B. This signature definitely indicates that the analysis report has already been checked by a checker.

As already described, an analysis report normally contains a plurality of important items of information, such as a graph based on the data acquired through a measurement and the result of an analysis of the graph. Therefore, the checker needs to check each item of information and determine whether or not the information is correct. In the example of FIGS. 8A and 8B, the checker is required to check the validity of the content of each report item from various viewpoints, such as the normality of the waveform of the chromatogram, the presence of an impossibly abnormal value in the peak table, or an omission of a value in the table.

However, the conventional data processing system for an analytical instrument merely allows for the confirmation of whether or not the entire contents of the analysis report has been checked. It cannot keep a record which shows, for each of the report items, whether or not the item has been properly checked. Furthermore, since the system only records the check result for the entire analysis report, it is impossible to keep records of the check result and related information for each report item, such as the result concerning the acceptance or rejection of the information, name of the checker, date and time of the checking, and reason for the rejection (if rejected). Therefore, for example, when it is necessary to ask an operator for a repreparation of the report due to a problem with the content of some report item, the checker needs to inform the operator of the situation by writing down each report item having a problem and the reason for the problem on a piece of paper, or by direct verbal communication. Such a process lowers the working efficiency as well as constitutes a factor which causes an error.

If the analysis report is prepared in the form of a hard copy, it is naturally possible to write the check result at any location on the paper. However, if such a method is used, it is difficult to guarantee the authenticity of the checker as well as the date and time of the checking. Furthermore, manually performing such a task is extremely cumbersome and time-consuming.

CITATION LIST

Patent Literature

Patent Literature 1: JP 2013-073292 A

Non Patent Literature

Non Patent Literature 1: "Repooto Sakusei Tsuuru (Report Preparation Tool)", [online], Agilent Technologies Japan, Ltd., [accessed on Dec. 2, 2015], the Internet <URL: http://www.chem-agilent.com/contents.php?id=1001720>

Non Patent Literature 2: "LabSolutions LabSolutions Sougou: Kinou Shoukai Repooto Sakusei (LabSolutions LabSolutions General: Introduction to Functions—Report Preparation)", [online], Shimadzu Corporation, [accessed on Dec. 2, 2015], the Internet <URL: http://www.an.shimadzu.co.jp/data-net/labsolutions/function/7_smart_validated-report.htm>

SUMMARY OF INVENTION

Technical Problem

The present invention has been developed to solve the previously described problem. Its primary objective is to provide a data processing system for an analytical instrument and a data processing program for an analytical instrument which can record the result of the checking of the appropriateness of the content of a report item for each of the various report items described in an automatically prepared analysis report. The system and program should also allow a checker to freely record, in the report, necessary information for the repreparation of an analysis report or similar task, such as the reason for the problem if there is a problem with the content of a report item, thereby enhancing the reliability of the analysis report as well as improving the efficiency of the task of preparing and checking an analysis report.

Solution to Problem

The data processing system for an analytical instrument according to the present invention developed for solving the previously described problem is a data processing system for an analytical instrument including an operation unit to be operated by a user and a display unit as well as having the function of creating an analysis report in which various items of information including data collected with an analytical instrument or a plurality of analytical instruments and a process result based on the data are described, and the function of providing the analysis report in the form of an electronic file, the data processing system for an analytical instrument including:

a) a basic template storage section in which a template that specifies the form of an analysis report is stored, the template including an arrangement of a plurality of report items related to an analysis;

b) a check result record area setting processor for displaying, on a screen of the display unit, an image of the template retrieved from the basic template storage section according to a predetermined operation with the operation unit by a user, and for allowing the user to set, at a position on the image of the template, a check result record area for recording the result of the checking of a report content, according to a predetermined operation with the operation unit;

c) a check result recording format setter for setting, for all check result record areas set by the check result record area setting processor in one template or for each of a plurality of the check result record areas, a recording format of information in the check result record areas according to a predetermined operation with the operation unit; and d) a user template storage section for storing, as a template available for an automatic creation of an analysis report, the template for analysis report after the check result record areas are set by the check result record area setting processor and the recording format of information in the check result record areas are set by the check result recording format setter.

The type of analytical instrument is not specifically limited. Typically, the data processing system for an analytical instrument according to the present invention can be constructed using a computer including an operation unit and a display unit, with each component of the system embodied by running, on this computer, a characteristic program installed on the computer. In this case, the computer may be either a single computer or a system of computers connected to each other through a network.

Thus, the data processing program for an analytical instrument according to the present invention developed for solving the previously described problem is a data processing program for an analytical instrument for operating a computer so as to provide a data processing system for an analytical instrument or a plurality of analytical instruments including an operation unit to be operated by a user and a display unit, with the function of creating an analysis report in which various items of information including data collected with an analytical instrument or a plurality of analytical instruments and a process result based on the data are described, and the function of providing the analysis report in the form of an electronic file, the data processing program for an analytical instrument making the computer operate as:

a) a basic template storage section for storing a template that specifies the form of an analysis report, the template including an arrangement of a plurality of report items related to an analysis;

b) a check result record area setting process functional section for displaying, on a screen of the display unit, an image of the template retrieved from the basic template storage section according to a predetermined operation with the operation unit by a user, and for allowing the user to set, at a position on the image of the template, a check result record area for recording the result of the checking of a report content, according to a predetermined operation with the operation unit;

c) a check result recording format setting functional section for setting, for all of the check result record areas set by the check result record area setting process functional section in one template or for each of a plurality of the check result record areas, a recording format of information in the check result record areas according to a predetermined operation with the operation unit; and d) a user template storage functional section for storing, as a template available for an automatic creation of an analysis report, the template for analysis report after the check result record areas are set by the check result record area setting process functional section and the recording format of information in the check result record areas is set by the check result recording format setting functional section.

In the data processing system for an analytical instrument according to the present invention, a basic template which specifies the form of an analysis report is stored in the basic template storage section. The basic template may be prepared by a user, although it is preferable that the provider of the present system should prepare standard templates. The user (in the present case, a "user" is normally an administrator with a certain level of administrative right) performs a predetermined operation with the operation unit, whereupon the check result record area setting processor retrieves a template corresponding to that operation from the basic template storage section and displays an image of the template on the screen of the display unit. Then, the administrator performs another predetermined operation with the operation unit, whereupon the check result record area setting processor sets a check result record area at a position in the template corresponding to that operation. Thus, a check result record area can be set for any report item in the case where a plurality of report items are arranged in the template. This means that every report item may be provided with a check result record area, or only some of the report items may be each provided with a check result record area.

After the setting of the check result record area has been completed, the administrator performs a predetermined operation with the operation unit. According to this operation, the check result recording format setter sets the recording format of information in the check result record areas which have been set in the previously described manner. The recording format may be common to all check result record areas set in one template, or a different recording format may be set for each of the check result record areas. The user template storage section stores, as a template available for an automatic creation of an analysis report, a template for analysis report in which the check result record areas have been set in the previously described manner and the recording format of information in the check result record areas has been set. Thus, a template for analysis report with the check result record areas becomes ready for use at any point in time.

As one mode of the present invention, each of the check result record areas set in the template may include a graphical user interface (GUI) component which allows for the selection of one of a plurality of options, such as a dropdown list, and the check result recording format setter may be configured to allow for the setting of the options in the GUI component.

That is to say, it is preferable to allow for the setting of the options which indicate whether a graph, table or the like inserted in an information presentation field of a report item can be accepted without problem or should be rejected due to some problem. With this system, when inputting the check result after the checking of the content of a report item as will be described later, the checker can input the check result by performing an operation for selecting one of the prepared options, without performing, for example, an input of a text indicative of "accepted" or "rejected".

The previous mode of the present invention may additionally be configured so that each of the check result record areas to be set in the template includes a text box into which any text can be inputted, and the check result recording format setter allows for the setting of an option which requires an input into the text box.

In this configuration, for example, the system can be configured to require an input into the text box in the check result record area corresponding to a report item only when a graph, table or the like inserted in the information presentation field of that report item has been rejected due to some problem. By requiring the entry of the reason for the rejection into the text box, the reason will be kept as a record in the analysis report. This record can be reviewed, for example, by an operator who prepared the analysis report. Thus, the operator can certainly recognize what the problem is.

The data processing system for an analytical instrument according to the present invention may further include:

e) a report creator for receiving a selection of a template stored in the user template storage section and one or more data files which contain information to be reported, and for creating a report by inserting information based on the one or more data files into each report item in the selected template.

According to this configuration, the system can automatically create an analysis report using a template for analysis report in which the check result record areas are set.

The data processing system for an analytical instrument having the previously described configuration may further include:

f) a check result input receiver for displaying an analysis report created by the report creator on the screen of the display unit, and for receiving a selection or input of a check result using the operation unit in a check result record area in the analysis report; and g) an analysis report storage executer for withholding permission to an operation for storing the analysis report including the selection or input received through the check result input receiver, until the selection or entry for required items is completed for all check result record areas in the analysis report.

To check the analysis report created in the previously described manner, the checker performs a predetermined operation with the operation unit. Then, the check result input receiver displays the specified analysis report on the screen of the display unit. The checker visually checks the content of each report item on the displayed analysis report and performs an operation for inputting the check result. Specifically, for example, the checker selects, from the options, a check result indicative of "acceptance" for a content which is appropriate or one indicative of "rejection" for a content which has some problem. The check result input receiver receives such a selection or input of the check result using the operation unit in each check result record area in the analysis report and temporarily holds those results. At this point, the analysis report is not yet stored as an authenticated one.

When the selection or entry for the required items has been completed in all check result record areas in the analysis report, the analysis report storage executer gives permission to receive an operation for storing the analysis report. Specifically, a button for the storing operation may be enabled, or an alert message may be displayed to state that the operation of pressing the save button does not work if the entry into all check result record areas is not completed. When the storing operation has been performed after the entry into all check result record areas have been completed, the analysis report including the selection or input received through the check result input receiver is stored. Thus, an analysis report in which all check result record areas are filled with their respective check results is stored. An analysis report with no omission of the checking, or one which clearly demonstrates which report item has a problem, can be certainly obtained.

Advantageous Effects of Invention

With the data processing system for an analytical instrument and the data processing program for an analytical instrument according to the present invention, the result of a check performed by a checker or similar individual for each report item in an analysis report to determine whether or not the content of the report item is appropriate can be recorded in the same analysis report. The reliability of the analysis report is thereby enhanced, since it keeps a record of the fact that all report items or some important ones have been certainly checked by a checker. An operator or other individuals can review the check result for each report item in the checked analysis report and understand whether or not there is any problem with its content. The recording format of the check result can be specified so that the cause of the problem can be identified, which allows the reviewer to not only locate an item having a problem, but also understand the reason for the problem. Accordingly, the checker does not need to make paper-based or verbal communication with the operator as in the conventional case. This improves the working efficiency as well as decreases incorrect operations due to uncertain communications.

BRIEF DESCRIPTION OF DRAWINGS

FIG. 3 is a flowchart showing the procedure of the task of checking an analysis report in the data processing system for an analytical instrument according to the present embodiment.

FIG. 4 is a diagram showing one example of the template of an analysis report in the data processing system for an analytical instrument according to the present embodiment.

FIG. 5 is a model diagram showing one example of a setting window for setting the recording format of a check result record area in the data processing system for an analytical instrument according to the present embodiment.

DESCRIPTION OF EMBODIMENTS

One embodiment of the data processing system for an analytical instrument according to the present invention is hereinafter described with reference to the attached drawings.

Figure 1:
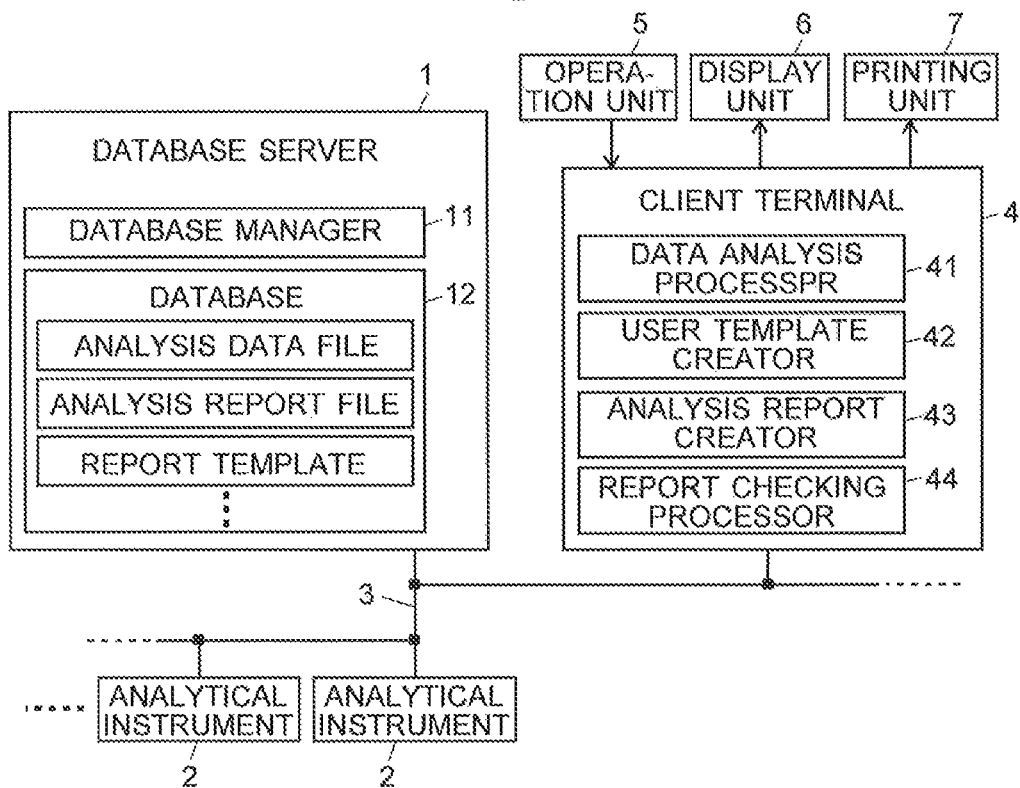
FIG. 1 is a schematic configuration diagram of one embodiment of the data processing system for an analytical instrument according to the present invention.

FIG. 1 is a configuration diagram of the main components of the data processing system for an analytical instrument according to the present embodiment.

The data processing system for an analytical instrument in the present embodiment includes: one or more analytical instruments 2 for performing a predetermined analysis on a sample and collecting measurement data; a database server 1 which is actually a computer; and a client terminal 4 which is actually a personal computer. These three kinds of devices are connected to each other through a network line 3, such as a local area network (LAN). Although FIG. 1 shows only a single client terminal 4, there may be multiple client terminals. The type of analytical instruments 2 is not specifically limited. For convenience of explanation, it is hereinafter assumed that the analytical instruments 2 are all liquid chromatograph (LC) apparatuses. An operation unit 5 which includes a mouse and keyboard, a display unit 6 which is a monitor, as well as a printing unit 7 are connected to the client terminal 4. Normally, an operation unit, display unit and other devices are also connected to the database server 1, although those units are not shown in FIG. 1.

The database server 1 has a database manager 11 and a database 12 as its functional blocks. Various kinds of data are to be stored in the database 12, typical examples of which include analysis data files, analysis report files, and report templates. An analysis data file is used to store various kinds of information related to an analysis, such as the data obtained with an analytical instrument 2, various calculated values obtained from the data, results of the processing of the data, as well as the conditions of the analysis and those of the data-analyzing process. One analysis data file normally contains information related to an analysis performed for one sample. An analysis report file is a file created through an analysis report creation process, which will be described later. Typically, this file is prepared in PDF format to prevent easy falsification. A report template specifies a form for creating an analysis report in a manner which will be described later.

The client terminal 4 includes a data analysis processor 41, user template creator 42, analysis report creator 43, report checking processor 44, and other functional blocks. As noted earlier, the database server 1 and the client terminal 4 are actually computers. Therefore, the aforementioned functional blocks are embodied by running, on those computers, dedicated programs previously installed on the computers. Those programs are one embodiment of the data processing program for an analytical instrument according to the present invention.

Figure 2:
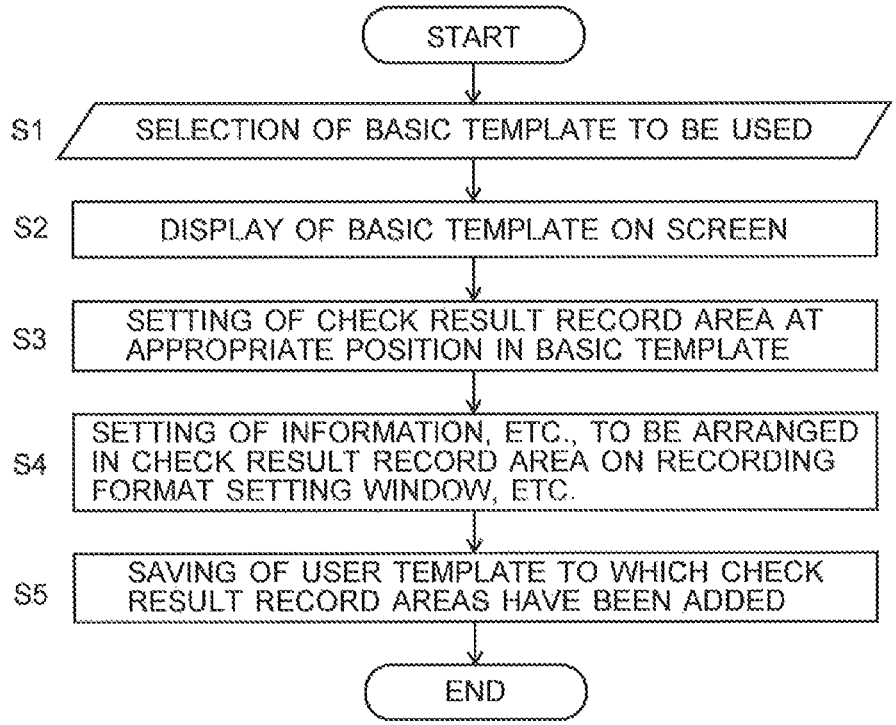
FIG. 2 is a flowchart showing the procedure of the task of creating a user template in the data processing system for an analytical instrument according to the present embodiment.
Figure 6:
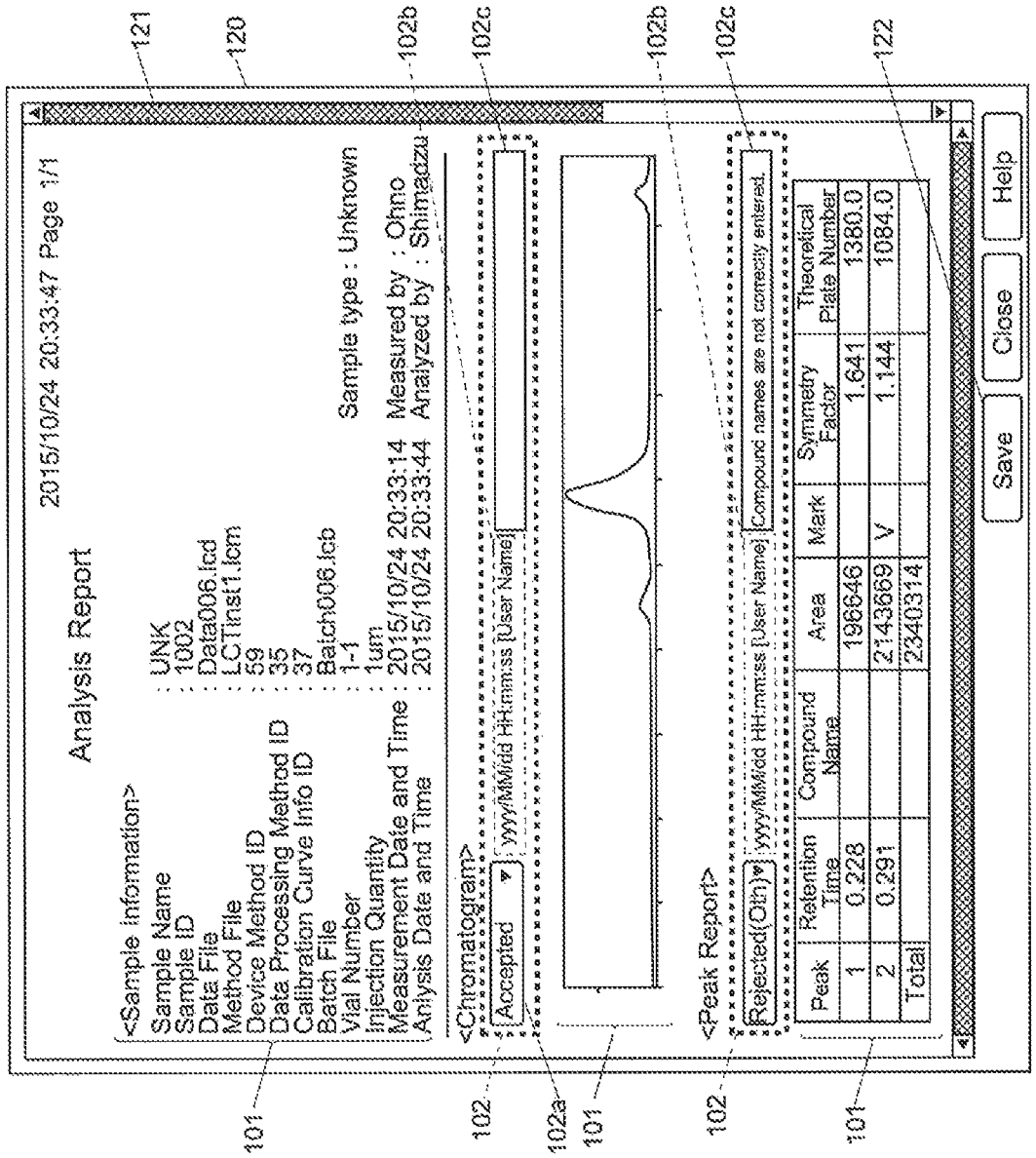
FIG. 6 is a model diagram showing one example of a window for checking an analysis report in the data processing system for an analytical instrument according to the present embodiment.
Figure 7:
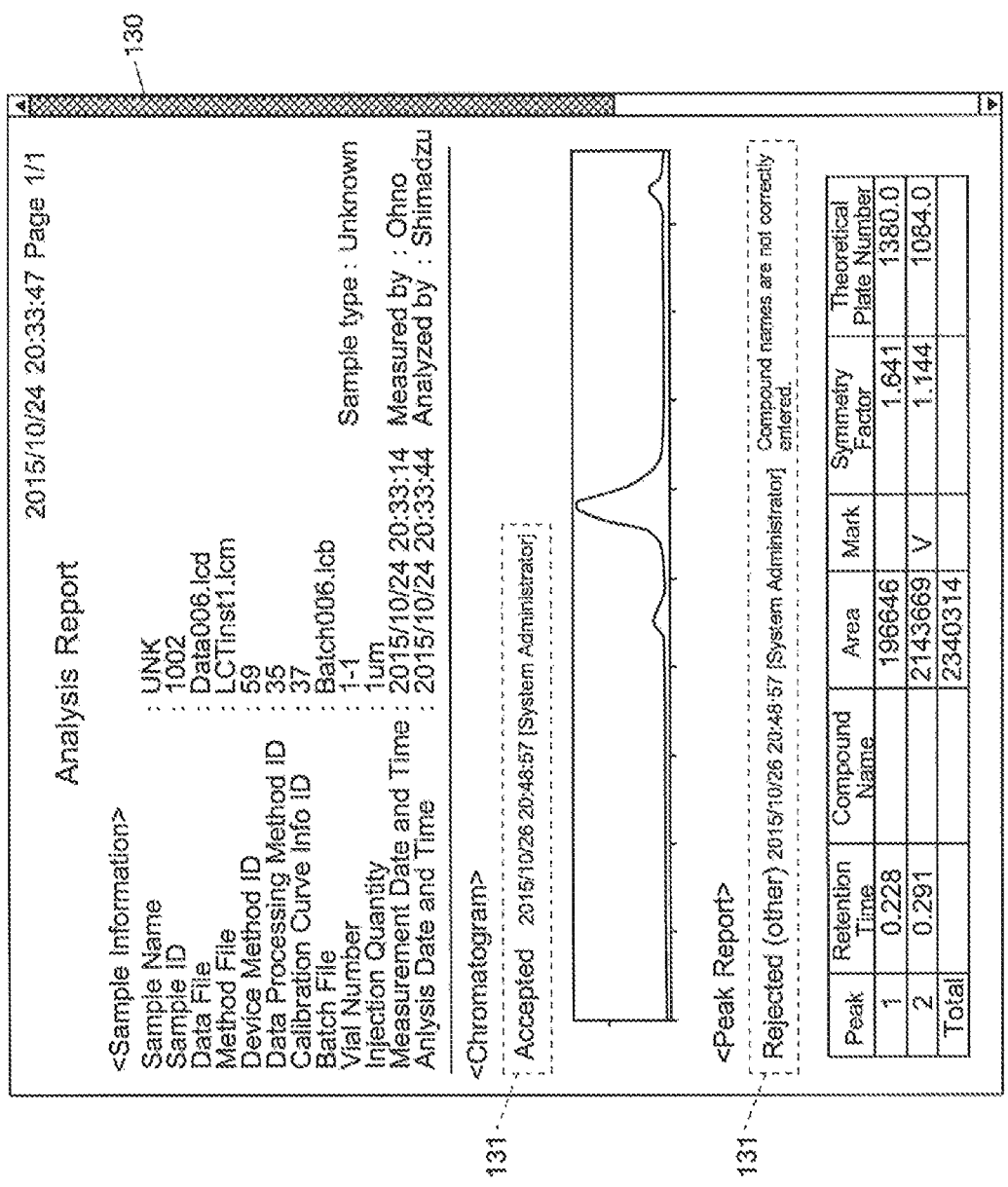
FIG. 7 is a diagram showing one example of an analysis report after the completion of the entry of check results in the data processing system for an analytical instrument according to the present embodiment.
Figure 8A:
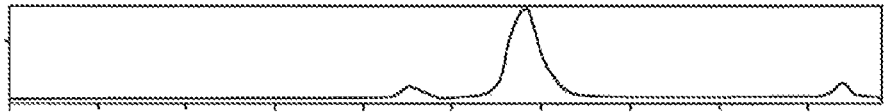
FIGS. 8A and 8B are model diagrams for explaining the procedure of the task of checking an analysis report in a conventional data processing system for an analytical instrument.
Figure 8B:

An analysis report creating operation, which is a characteristic operation in the data processing system for an analytical instrument according to the present embodiment, is hereinafter described. FIG. 2 is a flowchart showing the procedure of the task of creating a user template to be used in the analysis report creating operation. FIG. 3 is a flowchart showing the procedure of the task of checking an analysis report. FIG. 4 shows one example of the template for analysis report. FIG. 5 is a model diagram showing one example of a setting window for setting the recording format of a check result record area. FIG. 6 is a model diagram showing one example of a window for checking an analysis report. FIG. 7 is a diagram showing one example of an analysis report after the completion of the entry of check results.

In the database 12, various formats for an analysis report are previously stored as basic templates. Users can prepare those basic templates by themselves, or the provider of the present system may previously create basic templates and register them in the database 12. As shown in the example of FIG. 4, a template is a prescribed form (format) in which various report items to be reported are arranged, with each report item provided with an information area 101 into which the content of the report item will be inserted. It should be noted that the check result record areas 102 labelled "Checking Form" in FIG. 4 is not present in basic templates.

In advance of the creation of an analysis report, the user prepares a user template to be used by themselves based on the basic templates. The user who takes charge of the preparation of user templates is normally an administrator having an appropriate level of administrative right. Accordingly, this user is hereinafter called the "administrator". To prepare a user template, the administrator initially performs a predetermined operation with the operation unit 5 of the client terminal 4 to open a user template creation window. In response to this operation, the user template creator 42 begins to operate and displays the user template creation window on the screen of the display unit 6. On this window, the administrator selects a basic template to be used (Step S1).

The user template creator 42 reads the selected basic template from the database 12 and displays an image of the template within the user template creation window 100 (Step S2). The administrator indicates an appropriate position on the displayed image of the template with the operation unit 5 and issues a command to set a check result record area. Upon receiving this command, the user template creator 42 places a check result record area 102 at the indicated position on the template. FIG. 4 shows one example, in which the command to set the check result record area has been issued for two report items named "Chromatogram" and "Peak Report", while no command to set the check result record area has been issued for the report item named "Sample Information". The administrator can issue the command to set the check result record area for each of all report items that need to be checked by a checker (Step S3).

Next, the administrator sets the recording format in the check result record areas 102 (Step S4). In the present example, the recording format is common to all check result record areas 102 regardless of the number of those areas which have been set in one user template. The recording format specifies: the content of the information (which will be a character string in the eventually obtained analysis report) to be placed in the check result record area 102; the method by which the information should be inputted by the user (checker); and other elements. In the present example, as described in FIG. 6, one check result record area 102 is designed so that one dropdown list 102*a*, a character string 102*b* in which the date, time and checker's name (yyyy/MM/dd . . . ) will be automatically inserted, and a text box 102*c* in which any character string can be inputted, are horizontally arranged. Those contents of information and their arrangement can also be changed.

The options in the dropdown list 102*a* can be set in a recording format setting window 110 shown in FIG. 5. The character strings written in the "Check Result" field in the table 111 shown in this recording format setting window 110 are the character strings to be displayed as the options in the dropdown list 102*a*. Those character strings can be appropriately added or deleted by using the operation buttons 112 and other components. In the present example, the five options of "Accepted", "Rejected (ID:001)", "Rejected (ID: 002)", "Rejected (ID:003)" and "Rejected (Other)" will be displayed for selection in the dropdown list 102*a*. The IDs appended to the "Rejected" options are identification codes representing predefined reasons for the rejection. The user can appropriately define those codes.

The check boxes arranged in the column on the right side of the "Check Result" field in the table 111 indicate the judgment criterion for the determination of whether or not the entire analysis report should be accepted. In FIG. 5, only the check result "Accepted" is checked, which means that the analysis report should be judged as acceptable if the check result "Accepted" is recorded in all check result record areas 102. Accordingly, an analysis report which includes a report item that has been rejected for some reason (cause) may still be judged as acceptable depending on the state of checking of those boxes. Check boxes arranged in the column on the further right side in the table 111 should be checked when an entry of a reason into the text box 102*c* is compulsory. In FIG. 5, this check is only made for the check result "Rejected (Other)". This check is made because the reason for the rejection is unknown in the case of the check result "Rejected (Other)", whereas the reason for the rejection in the other cases is evident from their respective IDs. It is naturally possible to make the entry of the reason compulsory for all kinds of check results including the "Accepted".

After the setting in the recording format setting window 110 has been completed, the administrator clicks on the "OK" button 113 with the mouse or similar device in the operation unit 5. In response to this operation, the user template creator 42 fixes the setting and registers the user template inclusive of the set contents in the database 12 (Step S5).

Thus, the preparation of a user template to be used for the creation of an analysis report is completed.

When an analysis report needs to be prepared based on an acquired analysis data file, an operator performs a predetermined operation with the operation unit 5 to specify the user template to be used as well as the analysis data file containing the information to be reported, and issues a command to create an analysis report. The analysis report creator 43 reads the specified user template and analysis data file from the database 12. Then, it inserts various items of information stored in the analysis data file into the information areas 101 of the report item on the user template, such as the sample information, a chromatogram created from the data, and a peak table showing the information concerning the peaks on the chromatogram. Consequently, an analysis report as shown in FIG. 6 is obtained. The analysis report created in this manner is temporarily stored in a storage device in the client terminal 4. It is naturally possible to store this unchecked analysis report in the database 12.

The analysis report prepared by the operator in the previously described manner is still a draft or temporary version, which often contains errors or lacks necessary information. Accordingly, a checker who has a higher level of expertise in analysis than the operator normally checks the content of the analysis report, determines whether or not the content is appropriate, and keeps a record of the check result. This checking task is hereinafter described.

The checker performs a predetermined operation with the operation unit 5 to open a checking window. In response to this operation, the report checking processor 44 begins to operate and displays the checking window 120 on the screen of the display unit 6. The checker selects an analysis report to be checked and selects a command to execute the "checking process" for the selected report. In response to this selection, the report checking processor 44 reads the analysis report to be checked and displays it on the screen of the display unit 6. The analysis report 121 shown in FIG. 6 is one example of the report which is being checked. As shown in FIG. 6, the check result record areas 102 which have been set by the administrator are set on the analysis report 121 in this stage. In the present example, one dropdown list 102a, a character string 102b in which the date and time as well as the checker's name are automatically inserted, and a text box 102c are arranged in each check result record area 102.

The checker examines the content of each report item on the screen of the display unit 6 and inputs the check result into each check result record area 102 by performing the operation of selecting one of the options in the dropdown list 102a with the mouse or similar device in the operation unit 5. As described earlier, for an item for which the check result "Rejected (Other)" has been selected, the checker should describe the reason for the rejection in the text box 102c. The report checking processor 44 receives those inputs and temporarily holds the input information (Step S11). In the example of FIG. 6, the check result "Accepted" is selected in the check result record area 102 for the report item "Chromatogram", while the check result "Rejected (Other)" is selected in the check result record area 102 for the report item "Peak Report". Additionally, a sentence which states that "Compound names are not correctly entered" is written in the text box 102c as the reason for the rejection.

If the checker has clicked the "Save" button 122 to save the analysis report with the inputted check results (Step S12), the report checking processor 44 determines whether or not the check results have been inputted (selected) in all check result record areas 102 which are set in the analysis report, as well as whether or not some information has been entered in the text box 102c which must be filled in (Step S13). If there is a check result record area 102 in which the input is not completed, the report checking processor 44 pops up a message alerting the user to the fact that the saving operation is not permitted yet (Step S14), and returns to Step S11 Accordingly, even when the "Save" button 122 is clicked by the checker using the mouse, the processes of Steps S11 and S14 will be repeated until the check results are inputted in all check result record areas 102 as well as some information is entered in the text box 102c which must be filled in.

After the check results have been inputted in all check result record areas 102 and some information has been entered in the text box 102c which must be filled in, when the "Save" button 122 is clicked, the report checking processor 44 fixes the check results and the text information temporarily held at that point in time, and creates a PDF file of a checked analysis report, i.e. the analysis report to which the fixed contents are added in the form of character strings. In the character string 102b in each check result record area 102, the date and time of the fixation of the input as well as the registered user name corresponding to the user ID used by the checker for the login are automatically inserted. The PDF file is sent to the database server 1 and registered in the database 12 (Step S15).

Thus, the process for creating a checked analysis report is completed.

FIG. 7 is one example of the checked analysis report 130 created in the previously described manner. As noted earlier, the check result and text information entered in each check result record area 102 are directly recorded as the check result record information 131 in a section of the report. By reading this analysis report, the operator or other individuals can easily understand, for each report item, whether or not there is any problem with its content. If the replacement, correction or similar task is needed due to a problem with the content, the operator can certainly understand the reason for the problem. Compared to the conventional paper-based or oral communication, the communication according to the present embodiment is less likely to cause an omission of or error in the communication. The operator can view the check result through a nearby located client terminal. This improves the working efficiency.

In the previous embodiment, an alert message which states that the saving is not permitted is displayed in response to a clicking operation on the "Save" button 122 when the necessary information is not entered in all check result record areas 102. It is also possible to maintain the "Save" button 122 in the disabled state, i.e. in an opaque or similar appearance which indicates that the button cannot be operated, until the necessary information is entered in all check result record areas 102.

The previous embodiment is a mere example of the present invention, and any modification, addition or change appropriately made within the spirit of the present invention will evidently fall within the scope of claims of the present application.

For example, the information stored in the database 12 only needs to be accessible from the client terminal 4. Accordingly, the database 12 may be located in the client terminal 4 itself. The entire system may be incorporated into the analytical instrument 2. The functional blocks provided in the client terminal 4 in FIG. 1 may be distributed over multiple client terminals, or computers. For example, there may be a client terminal which is intended for exclusive use by administrators and is provided with all functions, while client terminals to be operated by operators are configured without the function of the user template creator 42, and furthermore, without the function of the report checking processor 44.

Naturally, the client terminal does not need to be a common type of computer; it may also be a tablet terminal, smartphone or similar portable information terminal which has the required functions, such as the function of viewing PDF files. It should also naturally be understood that the system according to the present invention can be constructed using a cloud computer or the like.

REFERENCE SIGNS LIST

1 . . . Database Server
11 . . . Database Manager
12 . . . Database
2 . . . Analytical Instrument
3 . . . Network
4 . . . Client Terminal
41 . . . Data Analysis Processor
42 . . . User Template Creator
43 . . . Analysis Report Creator
44 . . . Report Checking Processor
5 . . . Operation Unit
6 . . . Display Unit
7 . . . Printing Unit
100 . . . User Template Creation Window
101 . . . Information Area
102 . . . Check Result Record Area
102a . . . Dropdown List
102b . . . Character String
102c . . . Text Box
110 . . . Recording Format Setting Window
111 . . . Table
112 . . . Operation Button
113 . . . "OK" Button
120 . . . Checking Window 121, 130 . . . Analysis Report
122 . . . "Save" Button
131 . . . Check Result Record Information

The invention claimed is:

1. A data processing system for an analytical instrument including an operation unit to be operated by a user and a display unit as well as having a function of creating an analysis report in which various items of information including data collected with an analytical instrument and a process result based on the data are described, and a function of providing the analysis report in a form of an electronic file, the data processing system for an analytical instrument comprising:
   a) a basic template storage section in which a template that specifies a form of an analysis report is stored, the template including an arrangement of a plurality of report items related to an analysis;
   b) a check result record area setting processor for displaying, on a screen of the display unit, an image of the template retrieved from the basic template storage section according to a predetermined operation with the operation unit by a user, and for allowing the user to set, at a position on the image of the template for each of the plurality of report items, a check result record area for recording a result of checking of a report content, according to a predetermined operation with the operation unit;
   c) a check result recording format setter for setting, for all check result record areas set by the check result record area setting processor in one template or for each of the check result record areas, a recording format of information in the check result record areas according to a predetermined operation with the operation unit; and
   d) a user template storage section for storing, as a template available for an automatic creation of an analysis report, the template for analysis report after the check result record areas are set by the check result record area setting processor and the recording format of information in the check result record areas is set by the check result recording format setter,
   wherein each of the check result record areas set in the template includes a graphical user interface component which allows for a selection of one of a plurality of options, and the check result recording format setter allows for setting of the options in the graphical user interface component.

2. The data processing system for an analytical instrument according to claim 1, wherein:
   each of the check result record areas to be set in the template further includes a text box into which any text can be inputted, and the check result recording format setter allows for the setting of an option which requires an input into the text box.

3. The data processing system for an analytical instrument according to claim 1, further comprising:
   e) a report creator for receiving a selection of a template stored in the user template storage section and one or more data files which contain information to be reported, and for creating a report by inserting information based on the one or more data files into each report item in the selected template.

4. The data processing system for an analytical instrument according to claim 3, further comprising:
   f) a check result input receiver for displaying an analysis report created by the report creator on the screen of the display unit, and for receiving a selection or input of a check result using the operation unit in a check result record area in the analysis report; and
   g) an analysis report storage executer for withholding permission to an operation for storing the analysis report including the selection or input received through the check result input receiver, until the selection or entry for required items is completed for all check result record areas in the analysis report.

5. A non-transitory computer readable medium recording a data processing program for an analytical instrument for operating a computer so as to provide a data processing system for an analytical instrument including an operation unit to be operated by a user and a display unit, with a function of creating an analysis report in which various items of information including data collected with an analytical instrument and a process result based on the data are described, and a function of providing the analysis report in a form of an electronic file, wherein the data processing program for an analytical instrument makes the computer operate as:
   a) a basic template storage section for storing a template that specifies a form of an analysis report, the template including an arrangement of a plurality of report items related to an analysis;
   b) a check result record area setting process functional section for displaying, on a screen of the display unit, an image of the template retrieved from the basic template storage section according to a predetermined operation with the operation unit by a user, and for allowing the user to set, at a position on the image of the template for each of the plurality of report items, a check result record area for recording a result of checking of a report content, according to a predetermined operation with the operation unit;
   c) a check result recording format setting functional section for setting, for all of the check result record areas set by the check result record area setting process functional section in one template or for each of the check result record areas, a recording format of information in the check result record areas according to a predetermined operation with the operation unit; and
   d) a user template storage functional section for storing, as a template available for an automatic creation of an analysis report, the template for analysis report after the check result record areas are set by the check result record area setting process functional section and the recording format of information in the check result record areas is set by the check result recording format setting functional section,
   wherein each of the check result record areas set in the template includes a graphical user interface component which allows for a selection of one of a plurality of options, and the check result recording format setting functional section allows for setting of the options in the graphical user interface component.

6. The data processing system for an analytical instrument according to claim 2, further comprising:
   e) a report creator for receiving a selection of a template stored in the user template storage section and one or more data files which contain information to be reported, and for creating a report by inserting information based on the one or more data files into each report item in the selected template.

7. The data processing system for an analytical instrument according to claim 6, further comprising:
   f) a check result input receiver for displaying an analysis report created by the report creator on the screen of the display unit, and for receiving a selection or input of a check result using the operation unit in a check result record area in the analysis report; and g) an analysis report storage executer for withholding permission to an operation for storing the analysis report including the selection or input received through the check result input receiver, until the selection or entry for required items is completed for all check result record areas in the analysis report.

* * * * *